Oct. 14, 1969  F. KELLNER  3,472,564
BEARING DEVICE FOR STRAIGHT-LINE GUIDING
OF OBJECTIVE COMPONENTS
Filed March 7, 1968  2 Sheets-Sheet 1

Inventor
Ferdinand Kellner
By
Attorneys

Oct. 14, 1969       F. KELLNER       3,472,564
BEARING DEVICE FOR STRAIGHT-LINE GUIDING
OF OBJECTIVE COMPONENTS
Filed March 7, 1968       2 Sheets-Sheet 2
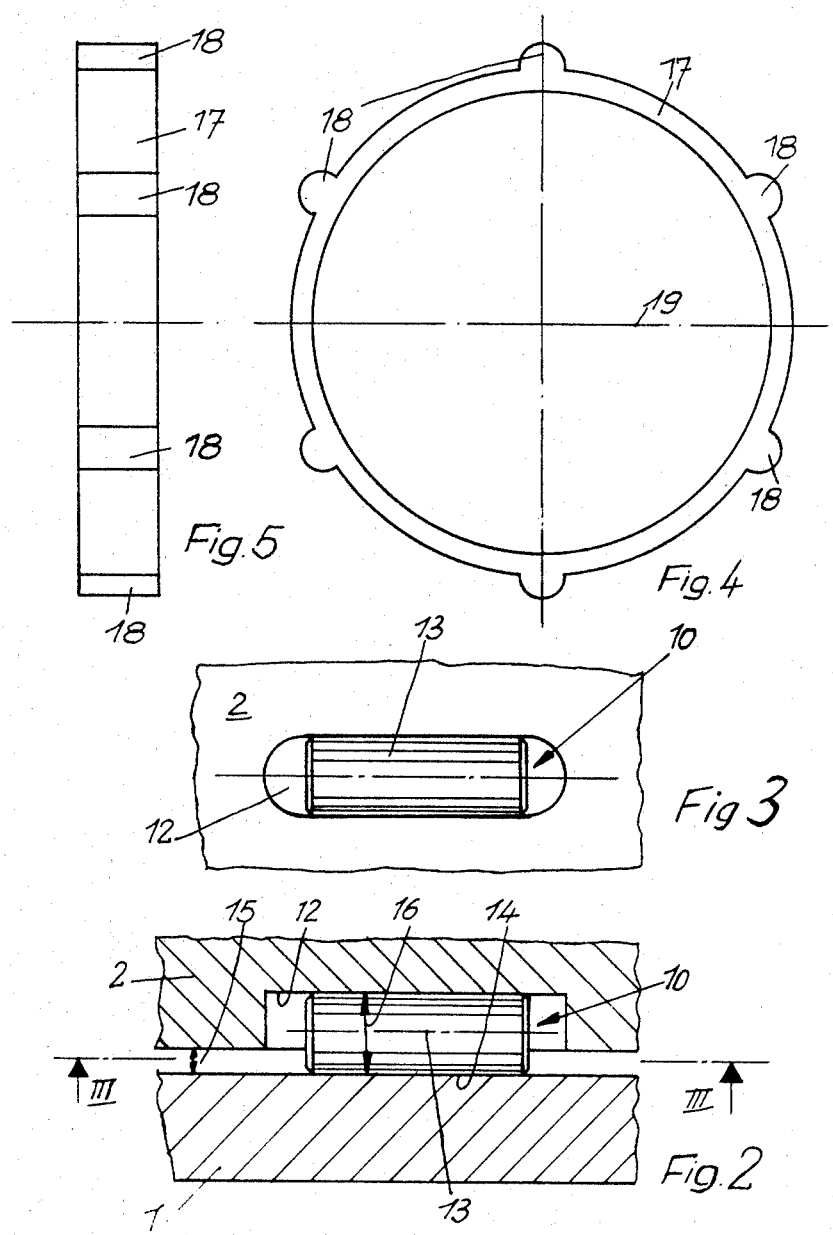

United States Patent Office 3,472,564
Patented Oct. 14, 1969

3,472,564
BEARING DEVICE FOR STRAIGHT-LINE GUIDING OF OBJECTIVE COMPONENTS
Ferdinand Kellner, 8941 Hart 14¼,
near Memmingen, Bavaria, Germany
Filed Mar. 7, 1968, Ser. No. 711,297
Int. Cl. F16c *1/26, 17/00, 21/00*
U.S. Cl. 308—4                      11 Claims

ABSTRACT OF THE DISCLOSURE

A bearing construction for straight-line guided objective parts for rapid focusing in which the cylindrical socket part carrying the objective is guided telescopically in the tube by a pair of axially spaced friction bearings, each comprising at least three glide bearing points, equally spaced circumferentially and formed at least partially of an elastic, wear-resistant plastic. The bearings being mounted in recesses in the outer surface of the objective carrying socket part and having bearing surfaces axially parallel to the axis of the socket part and of greater convexity circumferentially than the tube, providing line contacts.

---

Figure 1:
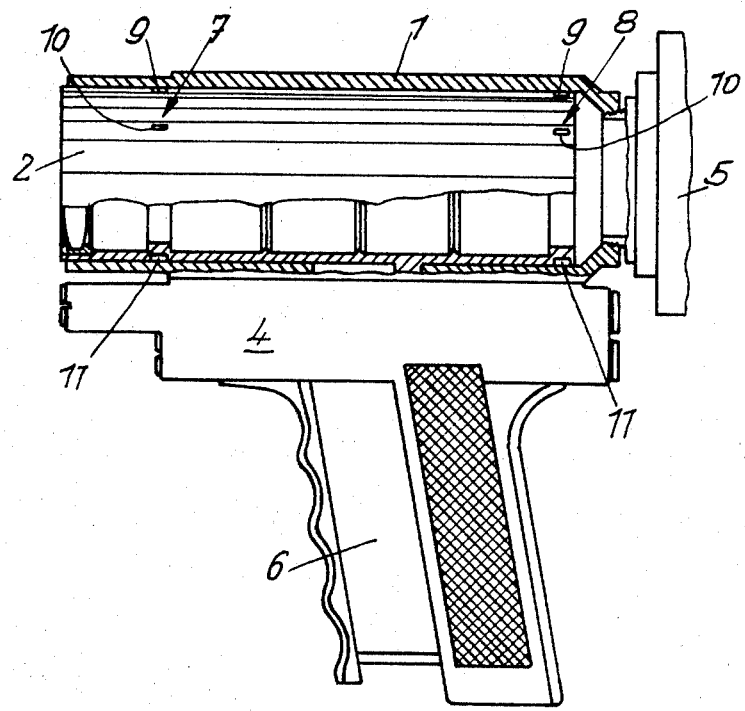

The present invention relates to a bearing device for objective components guided in a straight line, particularly for rapid focussing objectives in which the cylindrical socket part holding the objective is guided telescopically in a tube.

In the known rapid focussing objectives with two telescopically guided tubes which can be adjusted to each other by means of a compressible elastic handle, a perfect bearing of the shiftable tube component is very difficult. In order to be able to adjust by means of the compressible elastic handle quickly and precisely to new and far-away objects, it is necessary that the shifting movement is extremely soft-running. This is so because the spring power which brings the adjustable objective component back into its final position, must be relatively weak so that the adjusting hand can carry out the fine focussing without any effort. On the other hand it is, however, absolutely necessary to reach a bearing of the tubes within each other, without any clearance, as slackness or back-lash would have a disadvantageous effect on the fine focussing.

In an earlier known device it was tried to reach this smooth-running bearing without back-lash by using antifriction bodies of metal, such as e.g. steel balls. But a somewhat satisfying bearing can be obtained only with very high expenditure. The tubes to be shifted must be produced with the highest possible precision of their dimensions, whereby the bearing surfaces must simultaneously be absolutely smooth. This can be reached by round grinding, but the following further treatment of the parts, particularly the heating during eloxation and lacquering causes in many cases a distortion of the material and thus a jamming in the bearings. It must be taken into consideration in this connection that the walls of the tubes cannot be made of any thickness. Caused by the design and also for reasons of weight, only weak walls are acceptable which distort more easily.

These distorted parts must be eliminated as scrap and mean a considerable loss as the expenditure in material and work time is high for the practically finished parts.

On the other hand the distortion of the material is completely different and thus cannot be calculated beforehand. Also a preceding heat treatment which shall make possible the release of tension in the material already before grinding, a later distortion cannot be excluded. Experiences made in this direction have shown that components pre-treated in such a way distort in spite of this in the later eloxation or even only during the lacquering operation. But as the running surface of the antifriction bodies must absolutely be protected by eloxation against corrosion, it is possible neither to carry out the finished grinding at the end, i.e. after the eloxation. A production of the tubes of another material, e.g. brass, is not justified for reasons of weight and price in the size of the tubes. The incorporation of sleeves of other material as bearing sleeves is not possible either with the relatively weak walls.

An issue from these difficulties was tried by the measure of the so-called press-polishing. In this case the tubes are adapted to each other in their fit in such a way that the inner tube provided with incorporated antifriction bearings can be shifted into the outer tube only under a considerable pressure. By a frequent to and fro shifting in an adapted fixture each antifriction body smoothes its own path. A possible distortion of the tubes is compensated by the fact that the antifriction bearings press their path with a different depth. For this method the highest precision of all the parts is also necessary, so that there can hardly be made any savings in the production. A further disadvantage is that with a greater distortion of the tubes as it happens frequently, single antifriction bodies are pressed in too deeply. They then tear open the surface which was ground before with the highest possible precision and change it into a track with bumps and holes. The adjustment movement of the objective becomes "rough" and there is a "rumbling" which makes rather impossible an adjustment of the objective by small amounts, i.e. a precise fine focussing. This objective must be eliminated, and the tubes are scrap.

A further disadvantage is that an objective mounted in this manner can no longer be dismantled without destroying the obtained smooth running of the movement. But sometimes such a dismantling is necessary, e.g. for repair purposes. As the antifriction bearings cannot be fixed so exactly at their place, or only with a not justified expenditure, that they cannot be shifted laterally, it is hardly possible in case of a second mounting to bring each antifriction body in its old path. A new press-polishing becomes necessary with the success that the tubes must be eliminated as useless as a good running of the focussing movement can no longer be achieved.

It is the object of the invention to avoid the disadvantages of the described bearing device and to reach mainly a diminution of the production cost by avoiding scrap and the elimination of the round grinding and to reach a more precise focussing movement by the fact that the socket part can be moved smoothly and without any jolts in the tube. It shall besides be possible to dismantle the objective as many times as desired.

According to the invention this task is solved by providing at least two friction bearings at an axial distance from each other between the socket part and the tube. Each friction bearing has at least three bearing surfaces distributed around the periphery, which consist at least partially of an elastic, gliding, precise and wear-resistant plastic material. At each bearing surface there is furthermore an axially extending longitudinal glide body acting like a sledge runner.

According to the invention the friction bearings consist of polytetrafluorethylene (Teflon).

The advantage of the invention consists in the first line in the fact that the bearing surface for the glide bodies must not be ground. A finely lathed bearing surface is sufficient. The elastic glide bodies compensate the roughnesses formed by the turning grooves and glide over them like sledge runners. The material used, according to the invention, for the glide bodies warrants on the basis of its elasticity a good bearing without the necessity for high production precision in the production of the socket part and the tube. The polytetrafluorethylene which is preferably used is extremely smooth-running. The smallest adjustment powers are sufficient for a relative adjustment of the socket part of the objective in the tube. As the material used for the glide bodies has a high wear-resistance, a long service life for the bearing device according to the invention is guaranteed.

A further development of the invention consists in the fact that on each bearing surface in the outer surface of the socket part or the inner surface of the tube a recess for receiving the glide body is provided. In one embodiment this recess has the form of an axially extending longitudinal milled grove in which a single glide body is received. The milling-out of this longitudinal groove necessitates, however, high production costs. An advantage is obtained by an alternative embodiment of the invention which consists in the fact that the recess is configured as an annular groove and that the glide bodies are provided on an annular carrier. The glide bodies are thus equally distributed on a tape and this tape is placed into the annular groove. It is a particular advantage of this embodiment if the glide body carrier consists of two halves. Thereby the mounting is very simple.

The glide bodies according to the invention have convexly configured bearing surfaces in the direction of the periphery. The shape of the bearing surface does not vary over its axial length with the exception of the front edges which are chamfered according to the invention. The glide bodies have approximately a line contact with their neighboring bearing surface of the other telescopically mobile part. This warrants a highly precise bearing and guarantees a minimum friction. For the adjustment of the socket part of the object in the tube, extremely small adjustment forces are sufficient.

An advantageous configuration of the invention consists finally in the fact that the depth of the recess plus the radial distance between the socket part and the tube is slightly smaller than the effective height of the glide bodies, so that they are compressed slightly elastically in the incorporated state. This configuration gives the advantage that with a distortion of the material by the heat treatment in the eloxation this distortion is compensated by the elasticity of the glide bodies because single glide bodies are compressed somewhat more and others somewhat less. There is scrap by distortion. The focussing movement remains equally "soft" and is not influenced by a distortion of the tubes.

The invention is explained in detail on the basis of two drawings.

FIG. 1 shows a section through the objective with the bearing device according to the invention, FIG. 2 shows an enlarged section through the socket part, glide body and tube within the range of the bearing point, FIG. 3 is a view of the bearing point in the direction III—III of FIG. 2, FIG. 4 is a modified embodiment of a friction bearing element, and FIG. 5 is a front view of the friction bearing element according to FIG. 4.

In the tube 1 the objective socket part 2 carrying the lenses is borne in an easily shiftable manner. The tube 1 is fastened on the tube carrier 4; at the extremity of the tube 1 a camera 5 is mounted. The objective socket part 2 is in mechanical connection with a handle 6 which can be compressed against the effect of a light spring in order to shift the objective socket part 2 telescopically in the tube 1.

In the objective socket part 2 there are provided two friction bearings 7 and 8 arranged at a distance from each other. They consist each of at least three, but preferably six bearing points, 9, 10, 11, distributed uniformly around the periphery. The bearing points are all of the same configuration. The bearing point 10 is shown at a larger scale in FIGURES 2 and 3. The bearing point 10 consists of a longitudinal milled-out recess 12, in which a single glide body 13 is received. The glide body 13 has a cylindrical surface so that the contact between the glide body 13 and the bearing surface of the tube 1 takes place approximately along one single line. The depth of the groove 12 plus the radial distance 15 between the objective socket part 2 and the tube 1 is indeed slightly smaller than the effective height 16 of the glide body 13, so that in mounted state a small flattening of the bearing surface of the tube 1 is caused by the elasticity of the glide body 13.

The glide body 13 may be configured prismatically with the exception of the section protruding above the surface of the objective socket part 2, i.e. it may have parallel lateral surfaces and a lower surface orthogonal to it. In the shown embodiment a cylindrical form of the glide body 13 is preferred. The production is simpler, and besides a so configured glide body is even able to act as a rolling organ if the objective socket part 2 is rotated in the tube 1. The further advantage of the annular cylindrical glide body consists in the fact that the surface of the glide body does not always remain at the location but wanders around its circumference in the course of the operation of the objective. Thereby the abrasion becomes considerably smaller.

It can be seen furthermore that the ends of the glide body are chamfered, i.e. configured conically. This configuration contributes towards the glide body's 13 overcoming more easily roughnesses in the bearing surface of the tube 1.

In FIGURES 4 and 5 a modification of a bearing arrangement is shown. Instead of the single glide body 13, an annular carrier 17 is used, which has a number of glide bodies 18 evenly distributed around its periphery. The carrier 17 with the glide bodies 18 can be made out of one single piece. It is, however, advantageous to use a single carrier 17 on the jacket surface of which the single glide bodies 18 are fastened, e.g. by glueing. The carrier 17 with the glide bodies 18 does no longer require the expensive milling-out of longitudinal single grooves 12 in the objective socket part 2, but it is sufficient to provide two annular grooves in the objective socket part 2 in which the two carriers 17 may be laid in. For mounting reasons it is suitable to configure the carrier 17 in two parts. The separating plane will then suitably coincide with the line 19 (FIG. 4).

The invention results in considerable savings in production cost. The round grinding of the bearing surface of the tube which has been necessary up to now is completely eliminated. A well-lathed surface is sufficient as bearing surface. The requirements concerning the production precision of the fit between the objective socket part 2 and the tube 1 can be kept lower thanks to the elasticity of the glide bodies 13 and 18 respectively. The possible distortion of the material caused by a heat treatment in eloxation does not cause any scrap as the elasticity of the glide bodies 13 and 18 respectively compensates this distortion because the single glide bodies can be compressed in a different manner. The extreme gliding capacity of the polytetrafluorethylene used according to the invention for the glide bodies 13, 18 together with the small gliding surfaces, allows a smooth running which was not reached up to now so that smallest forces are sufficient for focussing. Finally the service life of the bearing device according to the invention is very high thanks to the abrasion-resistance of the materials used. If, in spite of this, there should be wear and tear in the course of time, an extremely simple repair is made possible interchanging simply the worm glide bodies 13 or 18 respectively against new parts.

I claim:

1. Bearing device for straight-line guided objective parts, particularly of rapid focussing objectives in which the cylindrical socket part carrying the objective is guided in the tube telescopically, comprising the arrangement that between the objective socket part and the tube at least two friction bearings are arranged at an axial distance from each other and that each friction bearing has at least three glide points spaced circumferentially equidistantly apart consisting at least partially of an elastic, easily gliding, wear-resistant plastic material which is true to size, and wherein at each bearing point an axially extending longitudinal glide body is provided, each of said glide bodies having an exterior surface axially parallel to the axis of said tube and convex circumferentially of said tube on a smaller radius than said tube whereby an axially extending substantially line bearing contact is formed between each glide body and said tube.

2. Bearing device according to claim 1, wherein said glide body consists of polytetrafluorethylene.

3. Bearing device according to claim 1, wherein a recess for receiving the glide body is provided at each bearing point.

4. Bearing device according to claim 3, wherein the recess is arranged in the outer surface of the objective socket part.

5. Bearing device according to claim 4, wherein the recess has the form of an axially extending milled-out groove (12) in which a single glide body (13) is received.

6. Bearing device according to claim 4, wherein the recess is configured as an annular groove and that the glide body (18) is provided on an annular carrier.

7. Bearing device according to claim 6, wherein the glide body carrier (17) consists of two halves.

8. Bearing device according to claim 1, wherein the bearing surface has a certain axial extent.

9. Bearing device according to claim 8, wherein the front edges of the glide body (13, 18) are chamfered on the bearing surfaces.

10. Bearing device according to claim 1, wherein the bearing bodies are of cylindrical configuration and are arranged axially parallel with the objective socket part.

11. Bearing device according to claim 1, characterized by the fact that the depth of the recess plus the radial distance between the objective socket part and the tube is slightly smaller than the effective height of the glide body and that they are pressed together slightly elastically in the mounted state.

References Cited

UNITED STATES PATENTS

| 2,938,444 | 5/1960 | Kellner | 95—45 |
|---|---|---|---|
| 3,039,834 | 6/1962 | Howe | 308—4 X |
| 3,113,441 | 12/1963 | Weasler | 308—4 |
| 3,240,244 | 3/1966 | Biro | 308—3.6 |
| 3,254,585 | 6/1966 | Gorey | 95—45 |
| 3,273,945 | 9/1966 | Hupp | 308—4 |
| 3,333,513 | 8/1967 | Wettstein | 308—4 X |

MARTIN P. SCHWADRON, Primary Examiner

LUCIOUS L. JOHNSON, Assistant Examiner

U.S. Cl. X.R.

95—45; 308—238; 350—255

PO-1050
(5/69)

UNITED STATES PATENT OFFICE
CERTIFICATE OF CORRECTION

Patent No. 3,472,564      Dated     October 14, 1969

Inventor(s) Ferdinand Kellner

It is certified that error appears in the above-identified patent and that said Letters Patent are hereby corrected as shown below:

Claims priority of German Application No. 30196 IXa/57c filed March 21, 1967

SEALED
FEB 24 1970

(SEAL)
Attest:

Edward M. Fletcher, Jr.
Attesting Officer

WILLIAM E. SCHUYLER, JR.
Commissioner of Patents